United States Patent
Melikian et al.

(10) Patent No.: US 8,923,602 B2
(45) Date of Patent: Dec. 30, 2014

(54) AUTOMATED GUIDANCE AND RECOGNITION SYSTEM AND METHOD OF THE SAME

(75) Inventors: Simon Melikian, Westlake, OH (US); Maximiliano A. Falcone, Southfield, MI (US); Joseph Cyrek, Southfield, MI (US)

(73) Assignees: Comau, Inc., Southfield, MI (US); Recognition Robotics, Inc., Westlake, OH (US)

( * ) Notice: Subject to any disclaimer, the term of this patent is extended or adjusted under 35 U.S.C. 154(b) by 1550 days.

(21) Appl. No.: 12/177,529

(22) Filed: Jul. 22, 2008

(65) Prior Publication Data

US 2010/0021051 A1    Jan. 28, 2010

(51) Int. Cl.
*G06K 9/62* (2006.01)
*G05B 19/18* (2006.01)
*B25J 9/16* (2006.01)

(52) U.S. Cl.
CPC ..... *B25J 9/1697* (2013.01); *G05B 2219/37555* (2013.01); *G05B 2219/39397* (2013.01); *G05B 2219/40003* (2013.01); *G05B 2219/37561* (2013.01)
USPC ........... 382/153; 382/159; 382/155; 382/154; 382/152; 700/253; 700/254

(58) Field of Classification Search
USPC ............ 382/106–108, 141–145, 151–155, 382/159–161, 181, 190, 195, 203, 274, 276, 382/286, 289, 312, 321; 700/252–254; 600/130; 435/5; 348/86, 127
See application file for complete search history.

(56) References Cited

U.S. PATENT DOCUMENTS

| | | | | |
|---|---|---|---|---|
| 3,617,016 A | * | 11/1971 | Bolsey | 244/3.16 |
| 4,653,109 A | * | 3/1987 | Lemelson et al. | 382/107 |
| 4,680,802 A | * | 7/1987 | Nishida et al. | 382/141 |
| 4,753,569 A | | 6/1988 | Pryor | |
| 4,831,531 A | * | 5/1989 | Adams et al. | 701/2 |

(Continued)

FOREIGN PATENT DOCUMENTS

DE    10351669 A1    6/2005
DE    102004005380 A1    9/2005

(Continued)

OTHER PUBLICATIONS

British Search Report under Section 17 dated May 29, 2009 from the corresponding British Patent Application No. GB0904326.6.

*Primary Examiner* — Chan Park
*Assistant Examiner* — Mia M Thomas
(74) *Attorney, Agent, or Firm* — Young Basile

(57) ABSTRACT

Disclosed herein are embodiments and methods of a visual guidance and recognition system requiring no calibration. One embodiment of the system comprises a servo actuated manipulator configured to perform a function, a camera mounted on the face plate of the manipulator, and a recognition controller configured to acquire a two dimensional image of the work piece. The manipulator controller is configured to receive and store the face plate position at a distance "A" between the reference work piece and the manipulator along an axis of the reference work piece when the reference work piece is in the camera's region of interest. The recognition controller is configured to learn the work piece from the image and the distance "A". During operation, a work piece is recognized with the system, and the manipulator is accurately positioned with respect to the work piece so that the manipulator can accurately perform its function.

21 Claims, 3 Drawing Sheets

(56) References Cited

U.S. PATENT DOCUMENTS

| | | | |
|---|---|---|---|
| 5,144,685 A * | 9/1992 | Nasar et al. | 382/153 |
| 5,329,469 A * | 7/1994 | Watanabe | 700/259 |
| 5,767,648 A * | 6/1998 | Morel et al. | 318/568.1 |
| 5,784,282 A | 7/1998 | Abitbol et al. | |
| 5,796,868 A * | 8/1998 | Dutta-Choudhury | 382/199 |
| 5,929,584 A * | 7/1999 | Gunnarsson et al. | 318/568.16 |
| 5,940,528 A * | 8/1999 | Tanaka et al. | 382/151 |
| 6,114,824 A * | 9/2000 | Watanabe | 318/568.12 |
| 6,166,811 A * | 12/2000 | Long et al. | 356/602 |
| 6,236,896 B1 | 5/2001 | Watanabe et al. | |
| 6,321,137 B1 * | 11/2001 | De Smet | 700/245 |
| 6,346,982 B1 * | 2/2002 | Yasuda et al. | 356/237.1 |
| 6,349,249 B1 * | 2/2002 | Cunningham | 701/28 |
| 6,351,324 B1 * | 2/2002 | Flint | 359/202.1 |
| 6,408,252 B1 * | 6/2002 | De Smet | 702/94 |
| 6,428,452 B1 * | 8/2002 | Dahlstrom et al. | 483/1 |
| 6,434,449 B1 * | 8/2002 | De Smet | 700/254 |
| 6,587,750 B2 * | 7/2003 | Gerbi et al. | 700/245 |
| 6,970,802 B2 * | 11/2005 | Ban et al. | 702/153 |
| 7,200,260 B1 * | 4/2007 | Watanabe et al. | 382/153 |
| 7,305,114 B2 * | 12/2007 | Wolff et al. | 382/141 |
| 7,454,053 B2 * | 11/2008 | Bryll et al. | 382/152 |
| 7,593,118 B2 * | 9/2009 | Tropf | 356/614 |
| 7,953,526 B2 * | 5/2011 | Durkos et al. | 701/25 |
| 8,108,072 B2 * | 1/2012 | Zhao et al. | 700/250 |
| 8,315,623 B1 * | 11/2012 | Flynn et al. | 455/423 |
| 8,338,743 B2 * | 12/2012 | Wanner et al. | 219/121.64 |
| 8,494,678 B2 * | 7/2013 | Quandt et al. | 700/253 |
| 2002/0136443 A1 * | 9/2002 | Chi et al. | 382/151 |
| 2003/0198376 A1 * | 10/2003 | Sadighi et al. | 382/153 |
| 2003/0206648 A1 * | 11/2003 | King et al. | 382/128 |
| 2004/0013295 A1 * | 1/2004 | Sabe et al. | 382/153 |
| 2004/0202362 A1 * | 10/2004 | Ishikawa et al. | 382/153 |
| 2005/0259860 A1 * | 11/2005 | Lewin et al. | 382/141 |
| 2005/0265596 A1 * | 12/2005 | Lohmann | 382/153 |
| 2006/0093205 A1 * | 5/2006 | Bryll et al. | 382/152 |
| 2006/0107508 A1 | 5/2006 | Bonse et al. | |
| 2006/0133663 A1 * | 6/2006 | Delaney | 382/152 |
| 2006/0180582 A1 * | 8/2006 | Andreasch et al. | 219/121.83 |
| 2007/0142823 A1 * | 6/2007 | Prisco et al. | 606/1 |
| 2007/0142968 A1 * | 6/2007 | Prisco et al. | 700/245 |
| 2008/0186311 A1 * | 8/2008 | Claus | 345/420 |
| 2008/0226184 A1 * | 9/2008 | Silverstein et al. | 382/238 |
| 2008/0240511 A1 | 10/2008 | Ban et al. | |
| 2009/0057373 A1 * | 3/2009 | Darzi et al. | 228/18 |
| 2009/0080761 A1 * | 3/2009 | Barker | 382/145 |
| 2009/0088897 A1 * | 4/2009 | Zhao et al. | 700/250 |
| 2009/0190826 A1 * | 7/2009 | Tate et al. | 382/153 |
| 2009/0207243 A1 * | 8/2009 | Kretschmer et al. | 348/86 |
| 2009/0248038 A1 * | 10/2009 | Blumenkranz et al. | 606/130 |
| 2010/0026784 A1 * | 2/2010 | Burazerovic | 348/46 |
| 2010/0282897 A1 * | 11/2010 | de la Torre | 244/49 |
| 2010/0295926 A1 * | 11/2010 | Estrada et al. | 348/47 |
| 2011/0161202 A1 * | 6/2011 | Arunachalan | 705/27.1 |
| 2012/0022683 A1 * | 1/2012 | Fleming et al. | 700/212 |
| 2012/0236201 A1 * | 9/2012 | Larsen et al. | 348/468 |
| 2012/0307027 A1 * | 12/2012 | Popovic et al. | 348/65 |
| 2013/0068738 A1 * | 3/2013 | Schurmann et al. | 219/121.72 |
| 2013/0178953 A1 * | 7/2013 | Wersborg et al. | 700/48 |
| 2013/0328227 A1 * | 12/2013 | McKinnon et al. | 264/40.1 |

FOREIGN PATENT DOCUMENTS

| | | | |
|---|---|---|---|
| DE | 102007009851 B3 | | 5/2008 |
| EP | 0151417 A1 | | 8/1985 |
| EP | 1043642 A3 | | 10/2000 |

\* cited by examiner

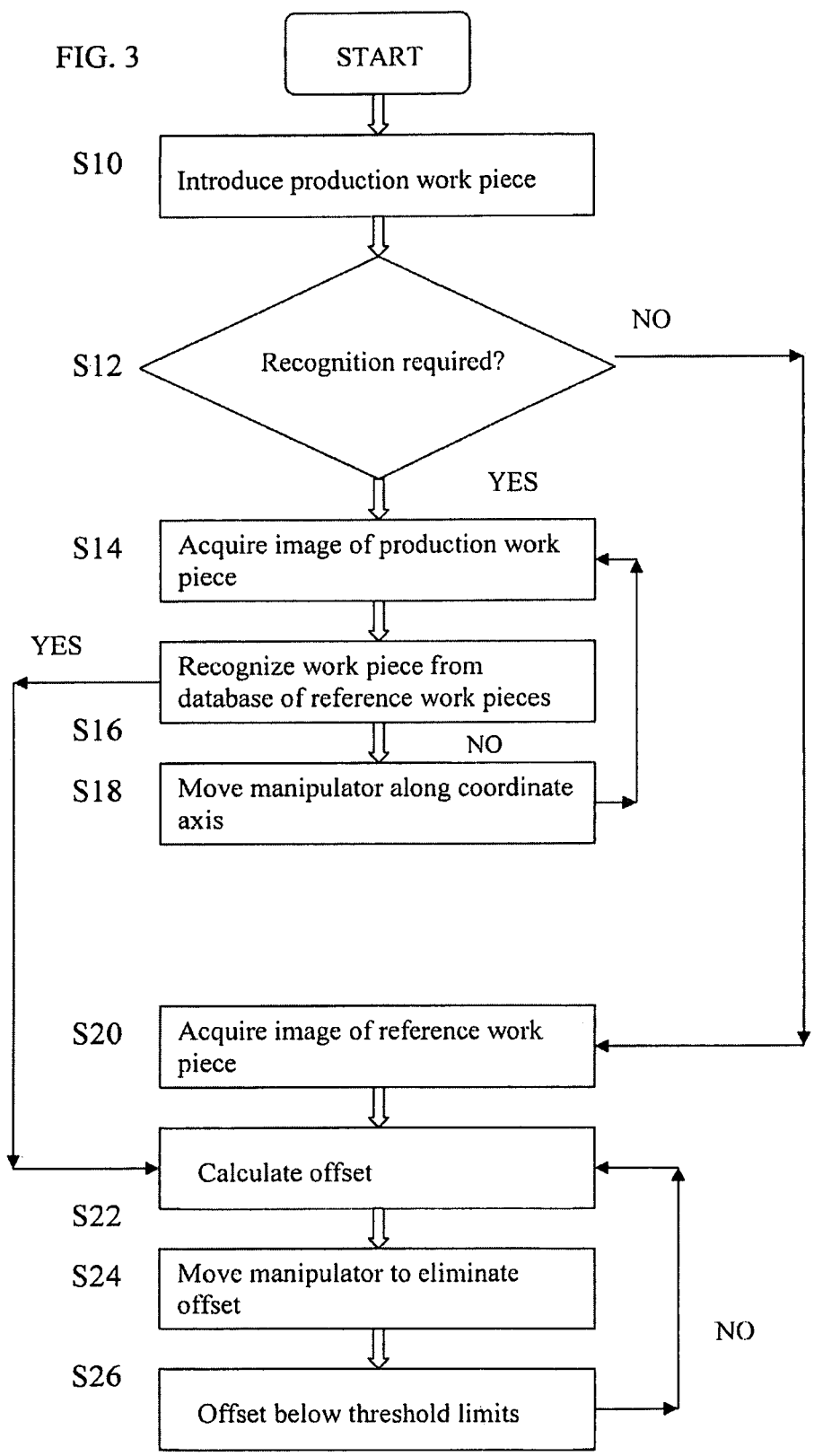

AUTOMATED GUIDANCE AND RECOGNITION SYSTEM AND METHOD OF THE SAME

FIELD OF THE INVENTION

The present invention relates to an automated guidance and recognition system for recognizing a work piece in three-dimensional space and being able to align a servo actuated manipulator relative to the work piece.

BACKGROUND

Due to the demand on manufacturers for higher quality parts and increased production, automation has increasingly been incorporated into manufacturing and assembly processes. Robots are one such automation technique that has been used extensively across many manufacturing industries. Robots can perform a wide range of functions such as inspection, welding, moving and manipulating parts, painting, etc. To perform a particular function, a robot must be programmed to perform the function on a particular work piece. However, this programming is based on a set of ideal parameters. The actual parameters between an industrial robot and a particular work piece differ from the ideal ones due to, for example, slight changes in the robots positioning and changes in the work piece's positioning. Consequently, each robot must be calibrated for a particular type of work piece and adjusted at each individual work piece based on the position of the work piece and the calibration. In addition, when the type of work piece is changed, whether between shifts or mid-stream, the robot either needs to be recalibrated or the type of work piece inputted into the robot controller so that the robot can adjust to the new geometry of a different piece.

There are many known systems for improving recognition and the positional accuracy of an industrial robot. Some systems use algorithms based upon a mathematical model of the robot's and work piece's geometries. A plurality of vision sensors, or a single movable vision sensor, is used to acquire images of the work piece from the robot at sufficient angles to produce a three-dimensional representation. Vision sensors are also used that incorporate lasers or other sources to project slit-like light on the work piece, whereby a three-dimensional image is obtained by the segmentation and reflection of the light. These systems typically involve complicated mathematical formulas and lengthy calibration procedures.

These existing systems currently can take a long time to perform for each type of work piece and can often required skilled people to calibrate them. Furthermore, changing the type of work piece in-line may not be feasible due to the calibration requirements between work pieces, decreasing flexibility and productivity of the manufacturing or production facility. Improvement in these areas is actively sought by the manufacturers and producers that use industrial robots in their operations.

SUMMARY

Embodiments of the visual guidance and recognition system for recognizing work pieces and guiding a servo actuated manipulator without a calibration target are disclosed herein. One embodiment of the visual guidance and recognition system comprises a servo actuated manipulator configured to perform a function, a camera mounted on or in fixed relation with a face plate of the manipulator, a recognition system configured to acquire a two dimensional image via the camera of at least a portion of at least one reference work piece and a manipulator controller configured to receive and store a position of the face plate at a distance "A" between the reference work piece and the manipulator along a coordinate axis of the reference work piece when the reference work piece image is acquired. The recognition system is further configured to learn the reference work piece based on the two dimensional image and the distance "A" associated with the reference work piece.

Another embodiment of the visual guidance and recognition system for recognizing work pieces and guiding a servo actuated manipulator without a calibration target comprises a recognition controller comprising a database of at least one reference work piece, a servo actuated manipulator configured to perform a function, a camera mounted on or in fixed relation with a face plate of the manipulator and a manipulator controller configured to control movement of the servo actuated manipulator. The recognition system is configured to acquire a two dimensional image via the camera of at least a portion of a production work piece, match the image of the production work piece with the reference work piece in the database, calculate a dimensional data offset between the image of the production work piece and an image associated with the reference work piece, and signal the manipulator controller to move the manipulator to decrease the offset until the offset is below a threshold limit.

Also disclosed herein are methods of visual guidance and recognition of a work piece using a camera and a manipulator without the need for calibration. On such method disclosed herein comprises positioning a reference work piece, storing a manipulator work position at the reference work piece in a manipulator controller, moving the manipulator along a coordinate axis of the reference work piece to a distance "A" wherein at least a portion of the reference work piece is in a region of interest of the camera, storing the position of a face plate of the manipulator at the distance "A" in the manipulator controller, acquiring a two dimensional image with a recognition controller via the camera of at least a portion of at least one reference work piece and learning the reference work piece with the recognition controller based on the two dimensional image and the distance "A" associated with the reference work piece.

BRIEF DESCRIPTION OF THE DRAWINGS

The description herein makes reference to the accompanying drawings wherein like reference numerals refer to like parts throughout the several views, and wherein:

FIG. 3 is a flow diagram of another embodiment of a method of visual guidance and recognition of a work piece.

DETAILED DESCRIPTION

Figure 1:
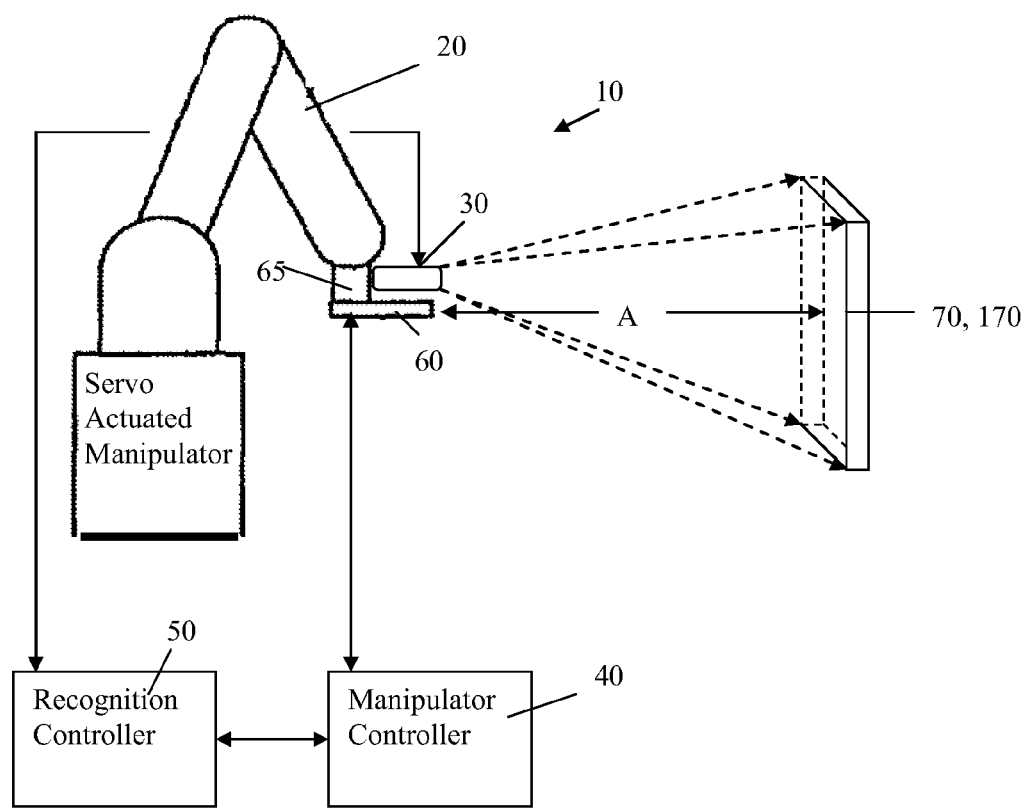
FIG. 1 is a schematic view of an embodiment of the visual guidance and recognition system disclosed herein.

FIG. 1 is a schematic view of an embodiment of a visual guidance and recognition system 10 that does not require calibration, as disclosed herein. The visual guidance and recognition system 10 comprises a servo actuated manipulator 20, a camera 30, a manipulator controller 40 and a recognition controller 50. The manipulator 20 has an end-effector 60 that physically varies depending on the function to which the manipulator has been programmed to perform. Non-limiting examples of end-effectors 60 include arms, welders, graspers, paint guns, and other tools required or desired for the manipulator 20 to perform its function. The end-effector 60 typically extends from a face plate 65 of the manipulator 20. The camera 30 is typically mounted on or in fixed relation to the face plate 65 of the manipulator 20. The vision recognition system 10 operates to recognize a work piece 70 and position the manipulator 20 accurately in relation to the work piece 70. The work piece 70 can be any part, component, product, etc. on which the manipulator 20 will perform the function. As non-limiting examples of functions, manipulators are typically used to perform welding, material handling, machine tending and the like.

The servo actuated manipulator 20 can be, for example, any type of robot or gantry known in the art. Non-limiting examples of types of robots include articulated, Cartesian, cylindrical, polar, and SCARA. Typical industrial robots and gantries feature six axes of motion (6 degrees of freedom), allowing for maximum flexibility. The servo actuated manipulators described are provided by way of example and not limitation, and other servo actuated manipulators known to those skilled in the art can be used.

The camera 30 incorporated into the vision recognition system 10 can be any two dimensional digital camera or video camera. As a nonlimiting example, the camera 30 can be a typical two dimensional image device such as a CCD or CMOS type camera. One such camera that can be used in the vision recognition system is a DALSA Genie. The cameras described are provided by way of example and not limitation, and other two-dimensional cameras known to those skilled in the art can be used. Although only a two-dimensional camera is described herein, the use of a three-dimensional vision sensor is contemplated, as well as the use of more than one camera or three-dimensional vision sensor.

The manipulator controller 40 can be a central processing unit that controls the movement of the manipulator based on the manipulator geometry, the work piece geometry, the function the manipulator will perform on the work piece, and any updated data inputted during set up or operation. Manipulator controllers are well known in the art and a detailed description of the manipulator controller herein is beyond the scope of this disclosure. Because the camera 30 can be mounted on the face plate 65 of the manipulator 20 or in fixed relation to the face plate 65, the manipulator controller 40 also controls the position of the camera 30.

The recognition controller 50 can be a central processing unit that is configured to acquire two dimensional images via the camera 30 and communicate with the manipulator controller 40 to signal for movement of the manipulator 20 based on the images acquired by the recognition controller 50. The central processing unit can be further configured with the visual guidance and recognition software, incorporated by reference below.

The communication links between the manipulator 20, manipulator controller 40, recognition controller 50 and camera 30 can transmit information, for example, through cables running from unit to unit. Alternatively, the communication links can be wireless, such as infra-red or radiofrequency. It is also contemplated that communication occurs through manually inputted data and signals by an operator. The communication links described are provided by way of example and not limitation, and other methods of communication can be used by those skilled in the art.

The visual guidance and recognition system 10 illustrated in FIG. 1 does not need to be calibrated prior to use. In other words, there is no need to relate the coordinate system of the camera 30 with the coordinate system of the manipulator 20 prior to set up or use due to the visual guidance and recognition software. The ability to proceed without calibration significantly reduces the set up time required for the system and reduces the amount of skill required by an operator of the system or production line in which the system is utilized. By eliminating the calibration step, production down time is also reduced, as recalibration during use is also not required. Significant economic advantages can be realized with the disclosed system, due in part to eliminating the calibration that currently must be done repeatedly to systems currently in use.

The visual guidance and recognition system 10 can undergo set up for one or a plurality of different work pieces. The amount of different reference pieces is limited only by system memory. Furthermore, the type of reference work pieces can vary in unlimited ways, including length, width, depth, shape, color, material, etc. The term "reference" simply means one of a type of work piece that is to be learned by the visual guidance and recognition system 10. It is not a special piece, but rather just one of a line of work pieces to which the manipulator will perform a particular function. For example, if one operation performed in a plant is to place a weld on a vehicle door frame, any one of the vehicle door frames that will receive the weld can be chosen for the reference work piece.

For each type or kind of work piece that a manipulator 30 might encounter during operation, the visual guidance and recognition system 10 must "learn" the work piece. This process is referred to as "set up." To set up for a type of work piece that represents a line of work pieces the manipulator 30 might encounter during operation, a reference work piece 70 is placed in a reference position. The reference position can be that position that simulates the position of the work piece during the actual operation. As used herein, "operation" refers to any process performed using the system 10 and methods disclosed herein. As non-limiting examples, operations can include processes, production, assembly, inspection, quantitative analysis, etc.

The manipulator 20 is placed in a work position, which is the position at which the end-effector 60 performs its function on the work piece 70. This work position is stored in the manipulator controller 40. The center point of the face plate 65 of the manipulator 20 is then moved to a distance "A" from the reference work piece 70 along a coordinate axis between the face plate of the manipulator 20 and the work piece 70. The distance "A" is determined when the reference work piece 70 is sufficiently within the region of interest (ROI) of the camera 30. The reference work piece 70 may be sufficiently within the ROI when the entire image of the reference work piece 70 is within the ROI, or when a portion an image of the reference work piece 70 is within the ROI. An example of an ROI is shown in FIG. 1 by the dashed arrows. The work piece 70 or portion thereof can further be centered within the ROI by movement of the manipulator 20 in the plane parallel to the reference work piece 70.

When the desired portion of the reference work piece 70 is sufficiently within the ROI of the camera 30, the manipulator controller 40 stores the position of the face plate 65 at the distance "A" for that reference work piece 70. A two dimensional image can be acquired by the recognition controller 50 via the camera 30 while the face plate 65 is positioned at distance "A". The recognition controller 50 can learn the reference work piece for future recognition of similar work pieces. The recognition controller 50 can store the two dimensional image with the associated distance "A" for the reference work piece 70 in the recognition controller's database.

It should be noted that the distance "A" is not limited to a distance between the work piece and the face plate along a coordinate axis. Rather the distance "A" can be the distance between two points on the reference work piece that is constant for that type of work piece. The corresponding distance on the corresponding image is stored in the manipulator controller 40 and associated with that reference work piece.

The learning by the recognition controller 50 of the reference work piece and the ability to store a plurality of learned reference work pieces and recognize the individual work pieces from the database can be performed using the system and method disclosed in U.S. patent application Ser. No. 12/101,583 to Melikian, filed on Apr. 11, 2008 and entitled SYSTEM AND METHOD FOR VISUAL RECOGNITION. In this system, an image of an object is learned or recognized by extracting unique points that are invariant to object presentations. The unique points are obtained by cross-correlating the image with a structure. Generally, the structure and/or the size of the structure may vary to detect extremum information associated with the learned object and/or target object. An icon corresponding to each of the unique points is extracted. The size of the icon corresponds to the scale of the unique point. After extraction of the various icons, an object becomes a collection of icons. Each of these icons is unrotated and normalized or resized to a constant size so it can be compared with other icons. One of the unique properties of these icons is their stability over scale and angle. This allows the recognition of an image(s) or object(s) from large number of trained images or objects very quickly.

The embodiment of the visual guidance and recognition system 10 in FIG. 1 can be used as follows during operation. In operational mode, a production work piece 170 is introduced to the manipulator 20 by conveyor, rack, bin, pallet, and the like. A production work piece 170 can be introduced to the manipulator in any manner known in the art and is not limited to the examples given. As used herein, production work piece refers to any work piece on which the manipulator 20 performs a function during operation.

The visual guidance and recognition system 10 can be adapted to individual facilities and individual operations as desired or required. In certain operations, it is contemplated that a particular manipulator will be assigned to a particular type of work piece. In other situations, the full range of capabilities of the system 10 can be utilized whereby a manipulator 20 will perform functions on a variety of work pieces in no particular sequence. Both situations are disclosed herein.

When the type of production work piece is known to the system 10, the system 10 can determine the position of the work piece in relation to the manipulator 20 when it is introduced in operation. The system 10 adjusts the manipulator 20 in relation to the production work piece 170 so that the function is performed by the manipulator 20 accurately on the work piece 170.

In operation, the manipulator will have an at rest position. The at rest position can be the position of the face plate 65 at the distance "A" associated with the type of work piece in operation. However, the at rest position is not limited to this position and can be any position desired or required by the operation. The least amount of programming steps can be realized, however, if the at rest position is the position of the face plate 65 at the distance "A" associated with the type of work piece in operation. When the production work piece 170 is operationally positioned in relation to the manipulator 20 in its at rest position, a two dimensional image of the production work piece 170 is acquired by the recognition controller 50 via the camera 30. The two dimensional image acquired by the recognition controller 50 of the production work piece 170 is compared to the two dimensional image of the associated reference work piece 70 acquired during set up.

During the comparison, the recognition controller 50 calculates an offset between the two images and signals the manipulator controller 40 to move the manipulator 20 to reduce the offset to below an acceptable threshold limit. The amount of translation, rotation, and scaling needed to transform the image of the production work piece is calculated such that the icon corresponding to each of the unique points of the production work piece overlaps the icon corresponding to each of the unique points of the reference work piece. The manipulator 20 is moved based on these calculations.

The offset can be recalculated as many times as necessary until the threshold is met. The threshold can vary depending on the accuracy required for the manipulator to complete its designated function. The less accuracy required, the wider the threshold offset limit will be. It is contemplated that some functions may require such accuracy that the threshold limit will be zero. Once the offset is below the threshold limit, the manipulator 20 can proceed with the function to be performed on the production work piece 170. When the function is complete, the production work piece 170 moves on and a new production work piece is introduced.

The manipulator controller 40 can move the manipulator 20 based on the signal from the recognition controller 50 all six degrees of freedom simultaneously. It is also contemplated that the manipulator controller 40 can alternatively move the manipulator 20 in steps, such as one step movement of three degrees of freedom and a second step movement of three degrees of freedom.

In an alternative embodiment, the visual guidance and recognition system 10 can be utilized to determine what type of work piece has been introduced and then accurately position the manipulator 20 in relation to the work piece to perform the programmed function associated with the work piece. The system 10 is capable of recognizing each work piece that is introduced to the manipulator 20, providing that an associated reference work piece has gone through the set up procedure. A database is stored in the recognition controller 50 of any reference work pieces 70 that are learned during the set up process. During operation, a production work piece 170 is introduced to the manipulator 20 in an at rest position in the manner described above. A two dimensional image of the production work piece 170 is acquired by the recognition controller 50 via the camera 30. The recognition controller 50 compares the two dimensional image of the production work piece 170 with the database of reference work pieces. The recognition controller associates the production work piece 170 with a reference work piece from the database by a shared number of reference points between the images.

Note that the distance "A" associated with each reference work piece is closely related to the size of the work piece. For a typical operational line, types of work pieces will likely be similar in size. This can be for many different reasons, including downstream operations such as palletizing, loading, etc. In such a situation, the at rest position for the manipulator 20 will not change significantly from type of work piece to type of work piece. One at rest position will be sufficient to recognize the various work pieces because a sufficient amount of the image will be acquired for comparison. In other words, it is not critical that the production work piece image be acquired with the same ROI as the reference work piece image. Recognition will still occur due to sufficient shared image data points. However, it is contemplated that dramatic changes in the size of work pieces may be desired or required in certain circumstances. When a much larger work piece is introduced to a manipulator at a rest position associated with a much smaller work piece, the image acquired at that rest position may not be sufficient to recognize the work piece. At this point, the recognition controller 50 will signal the manipulator controller 40 to adjust the distance "A" between the face plate and the work piece to acquire a sufficient two dimensional image of the work piece such that enough data points are identified position of the face plate 65 at the distance "A" associated with the type of work piece in operation to recognize the work piece.

Upon recognition of the production work piece 170, the recognition controller 50 has an image of the reference work piece 70 associated with the just taken image of the production work piece 170. The recognition controller 50 now determine the position of the production work piece 170 and adjusts the manipulator 20 in relation to the position based on the reference work piece image, as discussed above. Any offset between the image data points is calculated. The offset can be in any one or more of the six axes of motion. The recognition controller 50 signals the manipulator controller 40 to adjust the manipulator's position to reduce or eliminate the offset. This step can be repeated as necessary until the offset is below the threshold limit. When the offset is zero or below the predetermined threshold offset, the manipulator 20 is accurately positioned to perform its function on the production work piece 170.

In this embodiment, the visual guidance and recognition system 10 provides human-like capabilities. Once set up has been performed for a work piece, the work piece can be recognized by the system at any subsequent time. At no time must the system be calibrated. Work pieces can change in real time on a production line without any down time for reprogramming or recalibrating. Any one of a variety of work pieces can be positioned at the manipulator's station and recognized by the visual guidance and recognition system, with the manipulator being positioned to accurately perform a function on the work piece in a manner of seconds.

It should be noted that the camera 30 can send individual images to the recognition controller 50 during alignment, with the offset being calculated for each image, or the image can be continuously streamed to the recognition controller with the offset being continuously recalculated until the offset is below the threshold limit.

Figure 2:
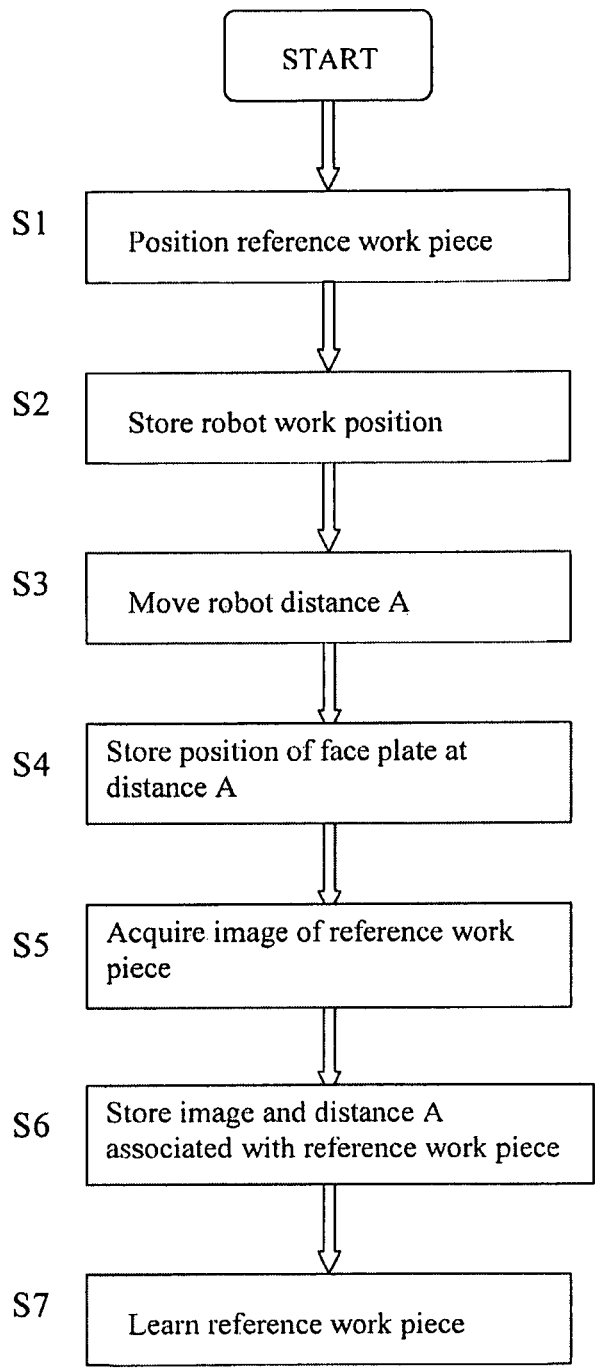
FIG. 2 is a flow diagram of an embodiment of a method of visual guidance and recognition of a work piece.

Also disclosed herein are methods for visual recognition and guidance of a work piece. FIG. 2 is a flow diagram depicting one such embodiment of a method disclosed herein, illustrating the learning of the reference work pieces. The method for visual guidance and recognition of a work piece comprises first positioning a reference work piece (S1). The position of the reference work piece can simulate the operational position of a production work piece in relation to the robot.

Next, a robot work position at the reference work piece will be stored in a manipulator controller (S2). In this step, the manipulator is physically moved to the reference work piece to the point at which the manipulator will perform its function. The manipulator will then be moved along a coordinate axis between the manipulator and the reference work piece to a distance "A" wherein at least a portion of the reference work piece is in a region of interest (ROI) of the camera (S3). As noted above, the entire work piece may be in the ROI of the camera, or just a portion of the work piece. There must be a sufficient amount of work piece within the ROI to differentiate the work piece from others. The position of the face plate of the manipulator at the distance "A" is stored in the manipulator controller (S4). An image of the reference work piece is acquired by the recognition controller via the camera (S5). The two dimensional image is stored in association with the distance "A" for the reference work piece (S6) and based on these data the recognition controller learns the reference work piece (S7).

The method may further comprise centering the reference work piece or portion of the reference work piece in the ROI by moving the manipulator along axes parallel to the work piece prior to acquiring the image via the camera.

This method can be performed for one reference work piece or for a plurality of reference work pieces. The two dimensional image and distance "A" associated with each reference piece can be stored in a database within the recognition controller.

Another embodiment of the method of visual guidance and recognition of a work piece involves a method used during operation, such as manufacturing, production or assembly, and is depicted in the flow diagram of FIG. 3. This embodiment comprises first introducing a production work piece (S10). Depending on the requirements of a particular operating system, work piece position determination may be required, or both recognition of a work piece and work piece position determination may be required (S12). If the manipulator is only associated with one function on one type of work piece, then recognition is not required and the work piece's position can be determined by first acquiring an image of at least a portion of the production work piece with the recognition controller via the camera (S20). If the manipulator is associated with more than one type of work piece, then recognition is required. The recognition controller acquires an image of at least a portion of the production work piece (S14).

The recognition controller compares the two dimensional image of the production work piece with the database of reference work piece images. A match indicates that the recognition controller has recognized the type of work piece (S16) and can properly determine the required relevant positioning of the manipulator and production work piece so that the manipulator can accurately perform its function. If for some reason the manipulator is located at a distance from the production work piece where the image does not contain sufficient data points for recognition, the recognition controller will signal the manipulator controller to move the manipulator along a coordinate axis from the production work piece (S18) and acquire a new image until the image is sufficient for recognition. When the work piece is recognized from the image, the recognition controller calculates the dimensional data offsets between the production work piece image and the reference work piece image (S22). The recognition controller signals the manipulator controller to move the manipulator in any one or more of six degrees of motion, dx, dy, dz, rx, ry, rz, to eliminate the offset or reduce the offset to below a certain threshold (S24). If the threshold is met, the manipulator is positioned relative to the production work piece to accurately perform its function on the work piece (S26). If the threshold is not met, the offset is recalculated and the manipulator is moved until the offset is zero or below the threshold limit.

The use of the visual guidance and recognition system and methods disclosed herein take only minutes to perform and can be done by one unskilled operator. The set up stage can be done at any time a new work piece needs to be introduced to the system. During operation, work piece types can continually change if desired or required, as the visual recognition system can recognize different work pieces in-line and in real time. Efficiency is greatly improved, thereby increasing productivity and profitability. It is contemplated that the system and methods disclosed herein can be used in any combination disclosed herein to optimize one's processes as desired or required.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for moving a servo actuated manipulator without a calibration target, comprising:
   a servo actuated manipulator configured to perform a function;
   a camera mounted on or in fixed relation with a face plate of the manipulator;
   a manipulator controller configured to move the manipulator; and
   a recognition system configured to:
      signal the manipulator controller to move the manipulator from a work position at a reference work piece to a distance "A" between the reference work piece and the manipulator along a coordinate axis of the reference work piece,
      acquire a two dimensional image via the camera of at least a portion of the reference work piece,
      learn the reference work piece based on the two dimensional image and the distance "A" associated with the reference work piece, and
      with the introduction of a production workpiece, signal the manipulator controller to move the manipulator to a work position at the production work piece based on the learning of the reference work piece and the distance "A" associated with the reference work piece.

2. The system of claim 1, wherein the recognition system is further configured to center the portion of the reference work piece in a region of interest by moving the manipulator along a coordinate axis parallel to the reference work piece prior to acquiring the two dimensional image.

3. The system of claim 1, wherein with the introduction of a production work piece to the manipulator, the recognition system is further configured to:
   with the servo actuated manipulator moved to a position corresponding to the distance "A" associated with the reference work piece, acquire a two dimensional image via the camera of at least a portion of the production work piece, and
   signal the manipulator controller to move the manipulator by an amount of dx, dy, dz, rx, ry, rz based on dimensional data offsets between the two dimensional images of the reference work piece and the production work piece.

4. The system of claim 3, wherein the recognition system is further configured to repeat calculation of the dimensional data offsets until a threshold offset limit is reached.

5. The system of claim 3, wherein the manipulator is configured to move dx, dy, dz, rx, ry, rz around a center of rotation located either on the face plate or along the coordinate axis.

6. The system of claim 3, wherein when the recognition system signals the manipulator controller to move the manipulator, the manipulator moves in two steps, the first step by an amount of dx, dy, dz, and the second step by an amount of rx, ry, rz based on the dimensional data offsets between the two dimensional images of the recognized reference work piece and the production work piece.

7. The system of claim 1, wherein the recognition system is further configured to learn and store in a database a large number of different reference work pieces each with an associated two dimensional image and a distance "A".

8. The system of claim 7, wherein, when a production work piece is introduced to the manipulator, the recognition system is further configured to acquire a two dimensional image via the camera of at least a portion of the production work piece and to recognize the production work piece as one of the large number of different reference work pieces in the database.

9. The system of claim 8, wherein, if the production work piece is not recognized, the manipulator controller moves the manipulator along the coordinate axis until the distance "A" is such that recognition system recognizes the production work piece.

10. The system of claim 8, wherein, once the production work piece is recognized, the recognition system is further configured to use the existing two dimensional image of the production work piece and signal the manipulator controller to move the manipulator by an amount of dx, dy, dz, rx, ry, rz based on dimensional data offsets between the two dimensional images of the recognized reference work piece and the production work piece.

11. The system of claim 10, wherein the recognition system is further configured to repeat calculation of the dimensional data offsets until a threshold offset limit is reached.

12. The system of claim 1, further comprising:
   the recognition system comprising a database of at least one reference work piece; and
   wherein the recognition system is further configured to acquire a two dimensional image via the camera of at least a portion of a production work piece, match the image of the production work piece with the reference work piece in the database, calculate a dimensional data offset between the image of the production work piece and an image associated with the reference work piece, and signal the manipulator controller to move the manipulator to decrease the offset until the offset is below a threshold limit.

13. A method for controlling the movement of a servo actuated manipulator without the need for calibration, using a camera, comprising:
   positioning a reference work piece;
   moving the manipulator to a work position at the reference work piece;
   moving the manipulator along a coordinate axis of the reference work piece from the work position to a distance "A" wherein at least a portion of the reference work piece is in a region of interest of the camera;
   acquiring a two dimensional image via the camera of at least a portion of the reference work piece;
   learning the reference work piece based on the two dimensional image and the distance "A" associated with the reference work piece; and
   with the introduction of a production workpiece, moving the manipulator to a work position at the production work piece based on the learning of the reference work piece and the distance "A" associated with the reference work piece.

14. The method of claim 13 further comprising:
   centering the portion of the reference work piece in the region of interest by moving the manipulator along a coordinate axis parallel to the reference work piece prior to acquiring the two dimensional image.

15. The method of claim 13 further comprising, with the instruction of a production work piece:
   moving the manipulator to a position corresponding to the distance "A" associated with the reference work piece;
   acquiring a two dimensional image via the camera of at least a portion of the production work piece;
   calculating dimensional data offsets between the two dimensional images of the recognized reference work piece and the production work piece; and moving the manipulator by an amount of dx, dy, dz, rx, ry, rz based on the dimensional data offsets.

16. The method of claim 15, further comprising repeating calculating the dimensional data offsets and moving the manipulator until a threshold offset limit is reached.

17. The method of claim 13 further comprising:
repeating the method for each of a plurality of different reference work pieces; and
creating a database of each two dimensional image and distance "A" associated with each of the plurality of difference reference work pieces.

18. The method of claim 17 further comprising, with the introduction of a production work piece:
moving the manipulator to a position corresponding to the distance "A" associated with the reference work piece;
acquiring a two dimensional image via the camera of at least a portion of the production work piece;
comparing the two dimensional image of the production work piece with the database of reference work pieces;
recognizing the production work piece from a reference work piece in the database;
calculating dimensional data offsets between the two dimensional images of the reference work piece and the production work piece; and
moving the manipulator by an amount of dx, dy, dz, rx, ry, rz based on the dimensional data offsets.

19. The method of claim 18, wherein if the production work piece is not recognized, moving the manipulator along the coordinate axis to change the distance "A" such that a reference work piece from the database is recognized.

20. The method of claim 18, further comprising repeating calculating the dimensional data offsets and moving the manipulator controller until a threshold offset limit is reached.

21. The method of claim 18, wherein the manipulator moves in two steps, the first step by an amount of dx, dy, dz, and the second step by an amount of rx, ry, rz based on dimensional data offsets between the two dimensional images of the reference work piece and the production work piece.

* * * * *